United States Patent
Liu et al.

(10) Patent No.: US 7,695,370 B2
(45) Date of Patent: Apr. 13, 2010

(54) MASSIVELY SCALABLE MULTI-PLAYER GAME SYSTEM

(75) Inventors: Derek Liu, Milpitas, CA (US); John Loethrer, Scotts Valley, CA (US)

(73) Assignee: Gaia Interactive Inc., San Jose, CA (US)

(*) Notice: Subject to any disclaimer, the term of this patent is extended or adjusted under 35 U.S.C. 154(b) by 441 days.

(21) Appl. No.: 11/349,789

(22) Filed: Feb. 8, 2006

(65) Prior Publication Data

US 2007/0184902 A1    Aug. 9, 2007

(51) Int. Cl.
G06F 17/00 (2006.01)
G06F 19/00 (2006.01)
G06F 15/16 (2006.01)
G06F 7/00 (2006.01)
G06F 17/30 (2006.01)

(52) U.S. Cl. .............. 463/42; 463/40; 463/41; 463/43; 709/201; 709/203; 709/204; 709/205; 709/227; 709/228; 709/229; 707/10; 707/104.1

(58) Field of Classification Search ............... 709/220, 709/221, 222, 223, 224, 225, 226, 201, 203–205, 709/227–229; 707/10, 104.1
See application file for complete search history.

(56) References Cited

U.S. PATENT DOCUMENTS

| | | | |
|---|---|---|---|
| 5,586,257 A | 12/1996 | Perlman | |
| 6,077,161 A | 6/2000 | Wisler | |
| 6,105,067 A * | 8/2000 | Batra | 709/227 |
| 6,152,824 A | 11/2000 | Rothschild | |
| 6,251,017 B1 | 6/2001 | Leason | |
| 6,711,678 B2 * | 3/2004 | Ferguson | 713/153 |
| 6,800,031 B2 | 10/2004 | Di Cesare | |
| 2004/0097287 A1 | 5/2004 | Postrel | |
| 2004/0152517 A1 | 8/2004 | Hardisty | |
| 2004/0152519 A1 | 8/2004 | Wang | |
| 2005/0043097 A1 * | 2/2005 | March et al. | 463/42 |
| 2005/0240935 A1 * | 10/2005 | Ramanathan | 718/105 |
| 2006/0047780 A1 * | 3/2006 | Patnude | 709/219 |
| 2006/0168217 A1 * | 7/2006 | Anand | 709/225 |
| 2006/0239263 A1 * | 10/2006 | Torronen et al. | 370/389 |
| 2007/0177575 A1 * | 8/2007 | Osenbach et al. | 370/351 |

OTHER PUBLICATIONS

World of Warcraft-Manual, 2004, Blizzard Entertainment, pp. 12, 14-15, 131-133.*

(Continued)

*Primary Examiner*—John M Hotaling
*Assistant Examiner*—Werner Garner
(74) *Attorney, Agent, or Firm*—S V Patent Service

(57) ABSTRACT

A network-based game system includes one or more web servers each configured to receive a plurality of requests from one or more game client applications each running on a computer device and to produce data base queries in accordance with the plurality of requests, a plurality of data bases configured to store game information that can be retrieved in response to the data base queries, and a connection pool server in communication with the one or more web servers and the plurality of data bases. The connection pool server is configured to direct one of the data base queries to one of the plurality of data bases on which the game information related to the data base query is stored.

20 Claims, 13 Drawing Sheets

| Game ID | Game Engine ID | Communication Protocol | Encryption Rules | Decryption Rules |
|---|---|---|---|---|
| Fishing | GE 1 | PHP | ..... | ..... |
| Soccer | GE 2 | XML | ..... | ..... |
| Halloween | GE 3 | AMF | ..... | ..... |
| Treasure Hunt | GE 4 | XML-RPC | ..... | ..... |
| Survival | GE 5 | PHP | ..... | ..... |
| ..... | ..... | ..... | ..... | ..... |

OTHER PUBLICATIONS

"World of Warcraft—Billing Support" World of Warcrft-Community Site. Feb. 8, 2005 <http://web.archive.org/web/20050208084141/www.blizzard.com/support/wowbilling/?id=ab101131p>.*

Gourley, David and Brian Totty, "HTTP: The Definitive Guide", Sep. 27, 2002, O'Reilly Media, Inc., 1st Edition.*

Kopparapu, Chandra, "Load Balancing Servers, Firewalls, and Caches", 2002, John Wiley & Sons, Inc.*

Mogul, Jeffrey C., "The Case for Persistent-Connection HTTP", 1995, SIGCOMM '95.*

Lefebvre, Jason and Paul Bertucci, "Sam's Teach Yourself ADO. NET in 24 Hours", May 10, 2002, Sam's.*

"Hypertext Transfer Protocol—HTTP/1.1-8 Connections", Jun. 19, 2000, available at <http://web.archive.org/web/20000619091506/www.w3.org/Protocols/rfc2616/rfc2616-sec8.html>.*

* cited by examiner

| Game ID | Game Engine ID | Communication Protocol | Encryption Rules | Decryption Rules |
|---|---|---|---|---|
| Fishing | GE 1 | PHP | ..... | ..... |
| Soccer | GE 2 | XML | ..... | ..... |
| Halloween | GE 3 | AMF | ..... | ..... |
| Treasure Hunt | GE 4 | XML-RPC | ..... | ..... |
| Survival | GE 5 | PHP | ..... | ..... |
| ..... | ..... | ..... | ..... | ..... |

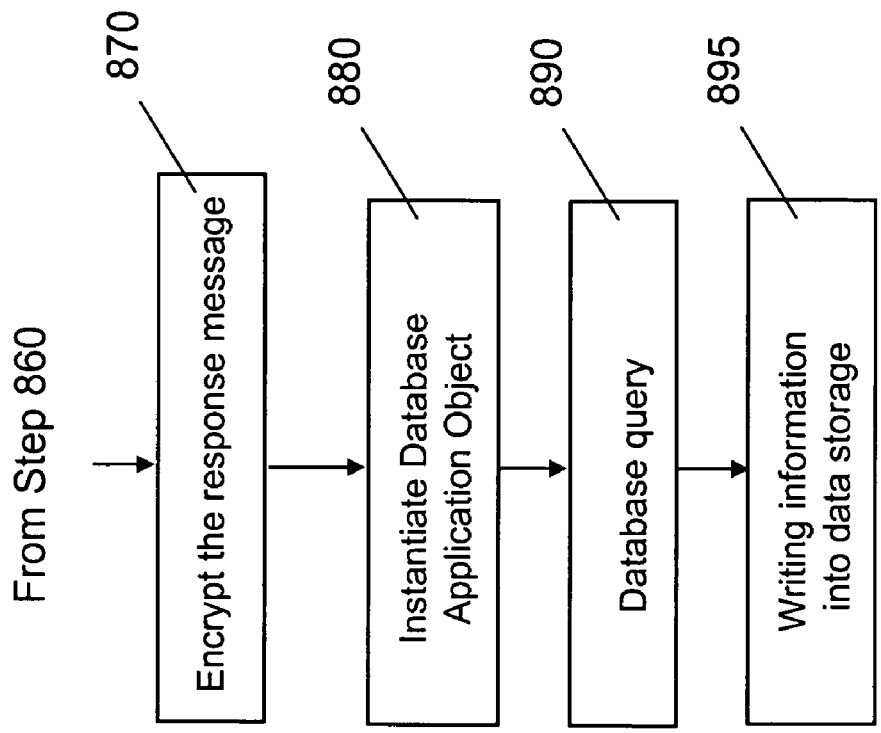

MASSIVELY SCALABLE MULTI-PLAYER GAME SYSTEM

CROSS REFERENCES TO RELATED APPLICATIONS

This application is related to concurrently filed and commonly assigned U.S. Patent Application, titled "Network-based game system capable of serving massive number of game players" by Liu et al, the contents of which are incorporated herein by reference.

TECHNICAL FIELD

This application relates to a game system, more specifically, a network-based game system.

BACKGROUND

Interactive online digital entertainment has advanced on many fronts in recent years, especially with respect to video gaming. For example, users can login to websites to find an opponent and then a game of chess or a card game in the virtual world. As a player may be competing against another player, the communication is bi-directional. However, not all video games can be played online. For a game of chess where time to make a move does not have an immediate and consequential effect on the outcome, players have time to contemplate the next move, counter move, game strategy and so on and the game does not need to provide real-time feedback. However, in a majority of real-time video games, time needed to make a decision and act upon that decision is relatively short so that players involved feel a sense of realism and engagement. In such a real-time game, action must occur in close proximity to real life events. Real-time action is required for the action games, simulation games such as flight simulators and sport games. In most cases persistent communications, scoring, player attributes, etc. cannot be offered together with real-time realism and engagement.

Another difficulty to the network-based game systems is scalability. While some existing network-based systems can handle tens of thousands of game players, it is a serious challenge to provide game applications in real time reliably and simultaneously to millions or even tens of millions of game players. Another challenge is to provide a large number of game rooms each hosting a number of game players. A further desired feature for network-based game systems is to effectively provide a wide selection of games to the players while maintaining the same performance in real-time responses to a large number of players or offering many games to game players within a unified social context and user identity.

SUMMARY

Implementations of the system may include one or more of the following. In one general aspect, the present invention relates to a network-based game system, comprising:

one or more web servers each configured to receive a plurality of requests from one or more game client applications each running on a computer device and to produce data base queries in accordance with the plurality of requests;

a plurality of data bases configured to store game information that can be retrieved in response to the data base queries; and a connection pool server in communication with the one or more web servers and the plurality of data bases, wherein the connection pool server is configured to direct one of the data base queries to one of the plurality of data bases on which the game information related to the data base query is stored.

In another general aspect, the present invention relates to a network-based game system, comprising:

one or more web servers each configured to receive a plurality of requests from one or more game client applications each running on a computer device and to produce data base queries in accordance with the plurality of requests;

a plurality of data bases configured to store game information that can be retrieved in response to the data base queries; and a connection pool server in communication with the one or more web servers and the plurality of data bases in persistent network connections, wherein the connection pool server is configured to direct one of the data base queries to one of the plurality of data bases on which the game information related to the data base query is stored.

In yet general another aspect, the present invention relates to a method for providing game services to a plurality of remote users, comprising:

receiving a request at a web server from a game client application running on a computer device in communication with the web server;

processing one of the request at the web server to produce one or more data base queries;

sending the data base queries from the web server to a connection pool server; and sending one of the data base queries through a persistent network connection from the connection pool server to a data base where the game information related to the data base query is stored.

Embodiments may include one or more of the following advantages. An advantage of the present invention is that the disclosed network-based game system can effectively provide gaming services to a massive number of game players while maintaining performance at the gaming website. The architecture of the disclosed network-based game system can be scaled to handle the increased amount of user data, game information, and simultaneous web requests by the game players as the number of game players rapidly increases. The disclosed network-based game system can provide excellent network performance when the user base is increased from hundreds of thousands, to millions of players and beyond.

Another advantage of the present invention is that the disclosed network-based gaming system can provide game applications simultaneously to many remote game players. A plurality of game players can play the same game in the same game room from different locations convenient to them. Many game players can play the same game applications while competing against each other or play separate game applications. The persistent communication paths allow game applications to be played with instantaneous responses without network latency at multiple remote locations.

Another advantage of the invention is that the disclosed system can provide many game applications to remote game players over a computer network using different serialization encryption protocols such as ATOMIC, XML, AMF, XML-RPC, etc. The game players can access game applications based on any of the protocols from a single network-based service. The selection of the game applications is significantly increased. Different game applications used by different game players can use different encryption protocols to play the same game or even play in the same game room.

Yet another advantage of the present invention is that the disclosed system can provide game applications to remote game players with persistent network connections while efficiently tracking and updating the game status of each of the players in an efficient manner. The disclosed system includes a persistent communication path that provides instantaneous message exchanges for the game applications in real time. The disclosed system includes a separate communication path that can respond to the requests game applications without consuming significant network resources and store game status information in storage devices.

Still another advantage of the invention is that the disclosed game system is efficient. The disclosed game system includes a communication path to the game client that does not need to be persistent through a game session. A call from the game client is answered and the communication session is closed and network connection freed up.

The efficient communication architecture allows the disclosed system to be scaled up easily without consuming significant network bandwidth as in the prior art systems. It can host millions of game players in millions of game sessions over a computer network. The number of game players supported by the disclosed system can be one or more orders of magnitudes higher than conventional network-based game systems.

Another advantage of the present invention is that it allows scalability to the hosting of a large number of game players in the same game room or in different game rooms. The communications to the game client application are divided into a persistent communication and an efficient but non-persistent communication path. The amount of information communicated in real time is minimized. A flexible layer by game-system-interface (GSI) program handles the non-persistent communications, which allows the network-based game system to handle a large number and variety of game client applications.

The details of one or more embodiments are set forth in the accompanying drawing and in the description below. Other features, objects, and advantages of the invention will become apparent from the description and drawings, and from the claims.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
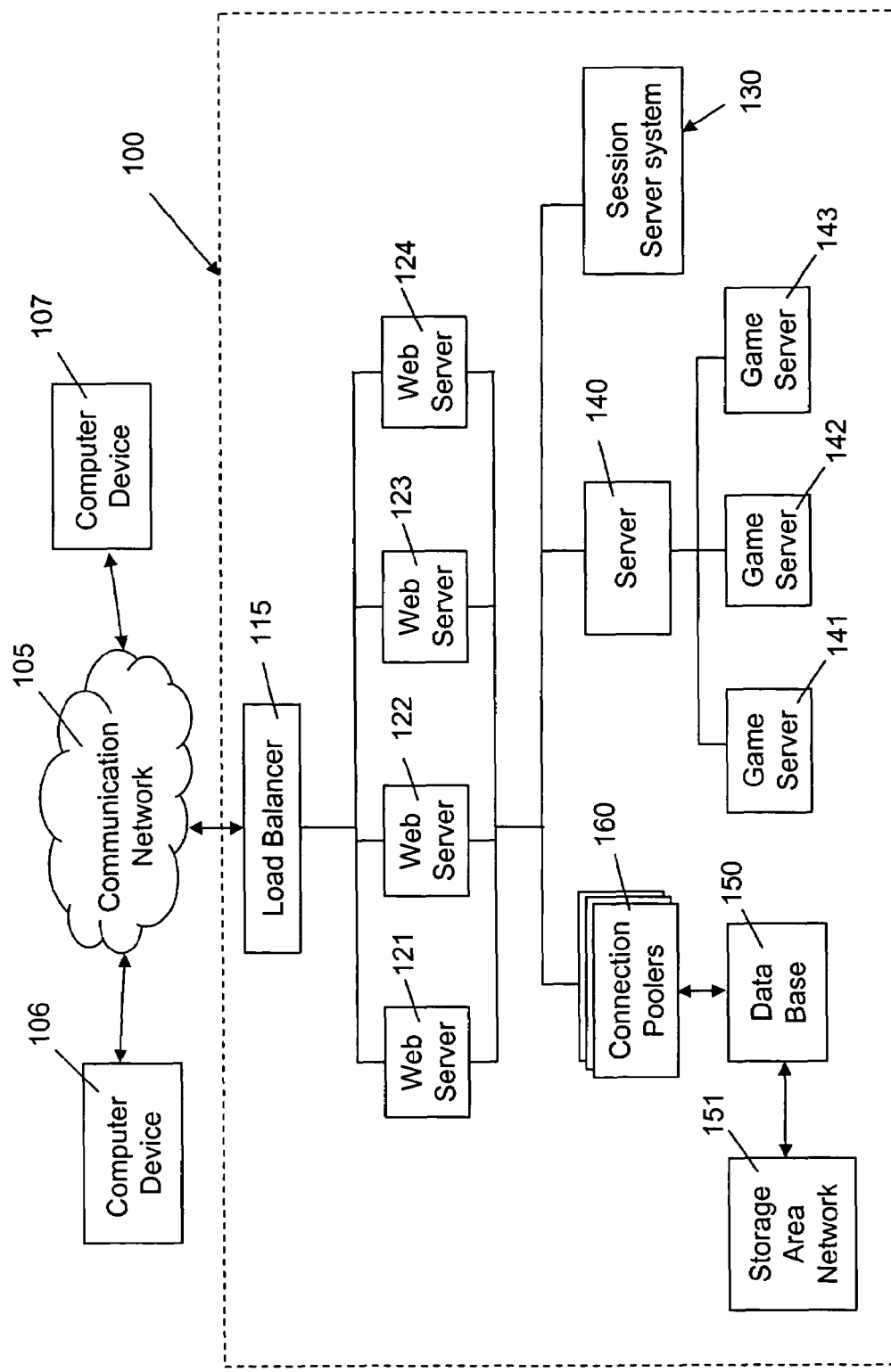
FIG. 1 is a system diagram of the network-based game system in accordance with the present invention.

Shown in FIG. 1, a network-based game system 100 can provide game applications over a communication network 105 to be played on many computer devices 106 and 107. The communication network 105 can include various wired, wireless, satellite communication arrangements including but not limited to a wide area network such as the Internet, a local area network, a cellular phone network under various communication protocols such as 2G, 2.5G and 3G, Global System for Mobile Communications (GSM), General Packet Radio Service (GPRS), EDGE, Code Division Multiple Access (CDMA), Wideband CDMA, TD-SCDMA, Universal Mobile Telecommunications System (UMTS), etc., and Wi-Fi wireless communication standards such as IEEE 802.11, Wi-Max, and IEEE 802.16 and others. The computer devices 106 and 107 can include personal computers, portable digital assistance (PDA) devices, cell phones, digital image capture devices, and dedicated game devices such as Microsoft XBOX, the SONY PlayStation OR PS2, and/or the Nintendo 64, GameCube, or GameBoy.

The network-based game system 100 can include a load balancer 115, one or more web servers 121-124, one or more session server system 130, a server 140, one or more game servers 141-143, one or more connection poolers 160, one or a plurality of data bases 150, and a storage area network 151 in connection with the data bases 150. The network-based game system 100 can be operated by a game service provider such as Gaia Interactive Inc., based in California, USA. The network-based game system 100 can provide a website on the Internet to host a game community and provide various game services such as games, discussion groups, and mails etc. A player can sign up at the website to own his or her own account. The player can also personalize his or her own profiles. As described below, the network-based system 100 can store game statistics and other game properties associated with a player in a networked storage device, available and updatable to the game player.

A game player can access the web site of the game service provider using computer devices 106 and 107 with a web browser application executed on the computer devices 106 or 107. The web browser applications are available from several manufacturers including Internet Explorer™ from Microsoft, Netscape™ from AOL, and Firefox™ from Mozilla and so on. Various Internet browsing applications are available to cellular phones, PDAs, game consoles, which are also compatible with the disclosed system and methods.

Figure 2:
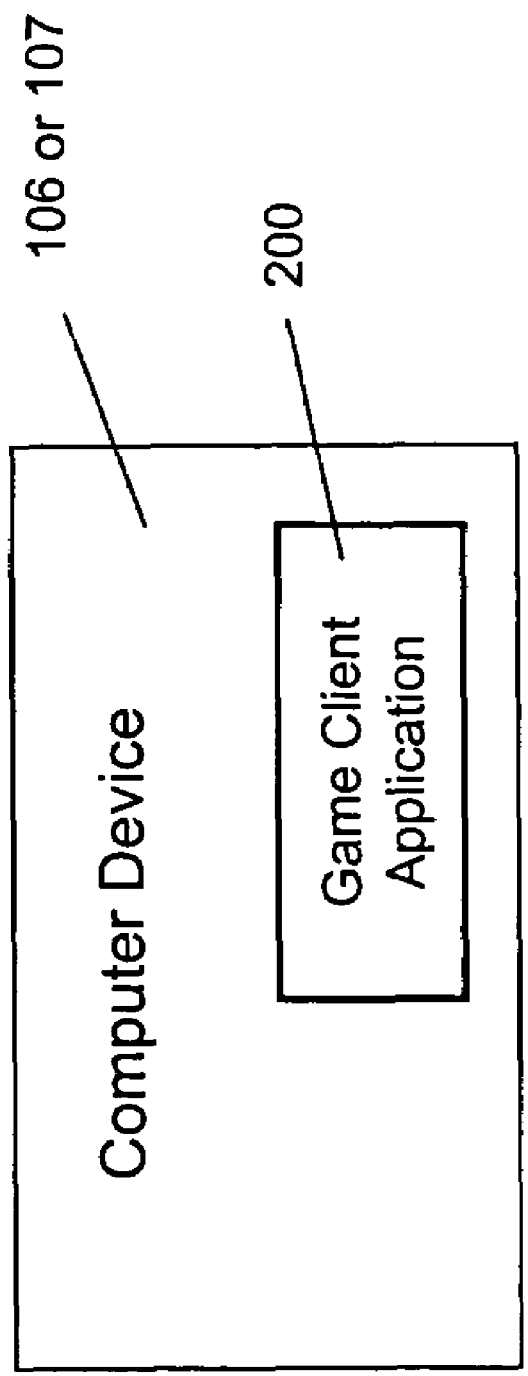
FIG. 2 shows a game client application that can be running on a computer device shown in FIG. 1.

A game client application 200 can reside on the computer device 106 or 107 as shown in FIG. 2. The game client application 200 can be executed by a plug-in to the web browser application. The game client application 200 can include game logic for one or more games and enable animation display for the games. The web-browser plug-in can enable the web browser to audio or video messages and properly display vector graphics images independent of the manufacturer or the version of the web browser. The web-browser plug-in can allow animations to be properly scaled to as web browser window is resized. The game client application 200 can use the web browser's communication API (Application Programming Interface) to communicate with various servers and devices (115, 121-124, 140-143 etc.) in the network-based game system 100.

Specifically, without limitation, the computer devices 106 and 107 can be installed with Flash plug-in produced by Macromedia Inc. Flash is a bandwidth friendly and browser independent vector-graphic animation technology. Animation is choreographed using one or more sequential timelines in which actions and interactions are defined. The Flash plug-in is attached to the web browsers running on the computer devices 106 and 107 to allow the web browser play SWF (Small Web Format) movie clips referenced in a webpage. Macromedia's Flash MX and Freehand applications and other Flash files can also be viewed through a Web browser plug-in (or the Flash player) or multimedia applications that access the player directly. Flash files can include sound. Flash can use the FLA files for source files and SWF files for the Flash movies. Flash files are space-efficient and suitable for interactions, comparing to other movie files (AVI, MPG, etc.) files.

The game client application 200 can be written in one or more SWF movie clips to be loaded in the web browser. Each game client application 200 can correspond to one or more games. The SWF movie clips include game logic as well as animations, images, and other effects. The SWF movie clips can communicate with servers in the network-based game system 100 using the library of functions provided by Macromedia's Flash plug-in. A library of APIs can be developed for the SWF movie clips that can be re-used in multiple games.

Figure 3:
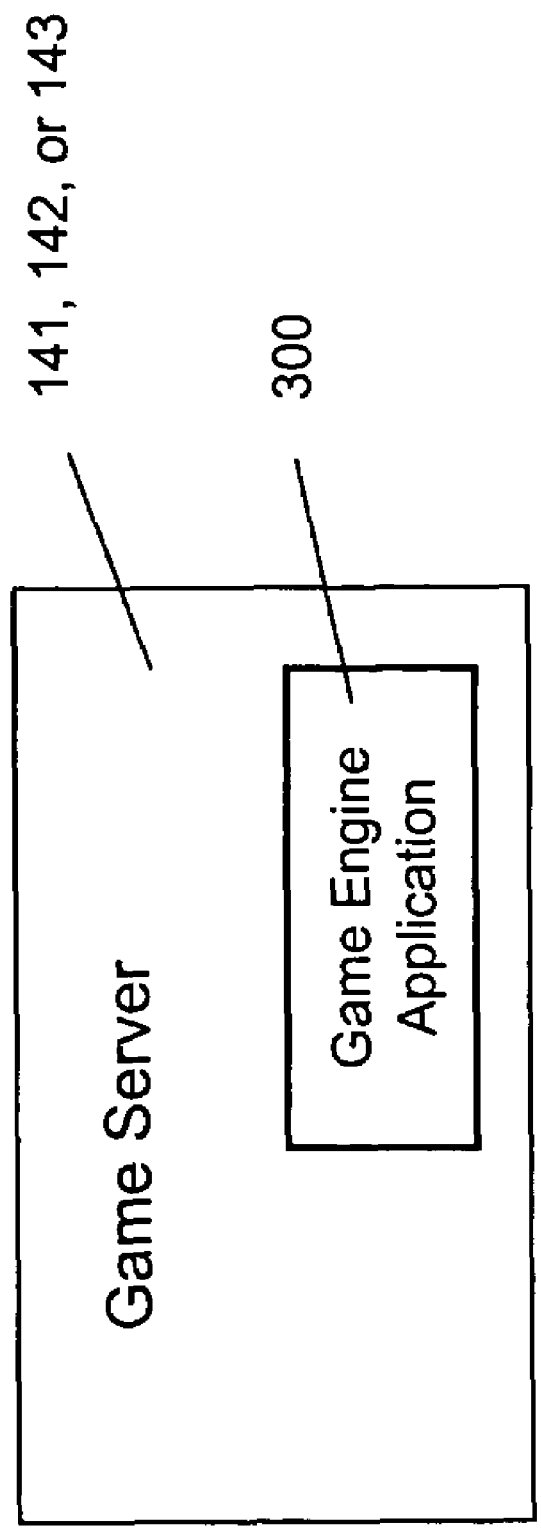
FIG. 3 shows a game engine application that can be stored on a game server shown in FIG. 1.

FIG. 3 shows a game engine application 300 stored on a game server 141, 142, or 143. The game engine application 300 is responsible for providing real-time responses to the game client application 200 during a game session. In the present application, the term "real-time communication" refers to the types of communications facilitated by a persistent network connection. The persistent network connection allows instantaneous and reliable communications between two components over the network without network latency.

The game server 141, 142, or 143 on which the game engine application 300 is stored can keep an open socket connection with the computer device 106 or 107. The game engine application 300 and the game client application 200 can send and receive TCP/IP messages to and from each other by writing and reading data to and from the socket. Messages can be sent and received from either the game server 141 (or 142 and 143) or the computer device 106 or 107 at any time. The persistent network connection allows instantaneous two-way communications and guarantees the games updated in real time without network latency at all time during a game session. A loss of connection in the persistent communication can be interpreted as that the game client application 200 has left the game.

The game engine application 300 is compatible with different server software implementations such as Sushi Multiuser Server, ElectroServer 3, and Terazona Network Engine. The network-based game system 100 can include many the game engine applications 300 developed using different server software. Different server software may require serialized messages encrypted under different serialization protocols. The communication protocols with these game engine applications 300 are provided by the GSI program 400.

The message serialization and de-serialization are used as examples of the encryption and decryption methods in the disclosed system and methods. The examples are meant to depict the flexibility and capability of the invention system. The present invention is compatible with other encryption and decryption techniques, and associated protocols.

Figure 4A:
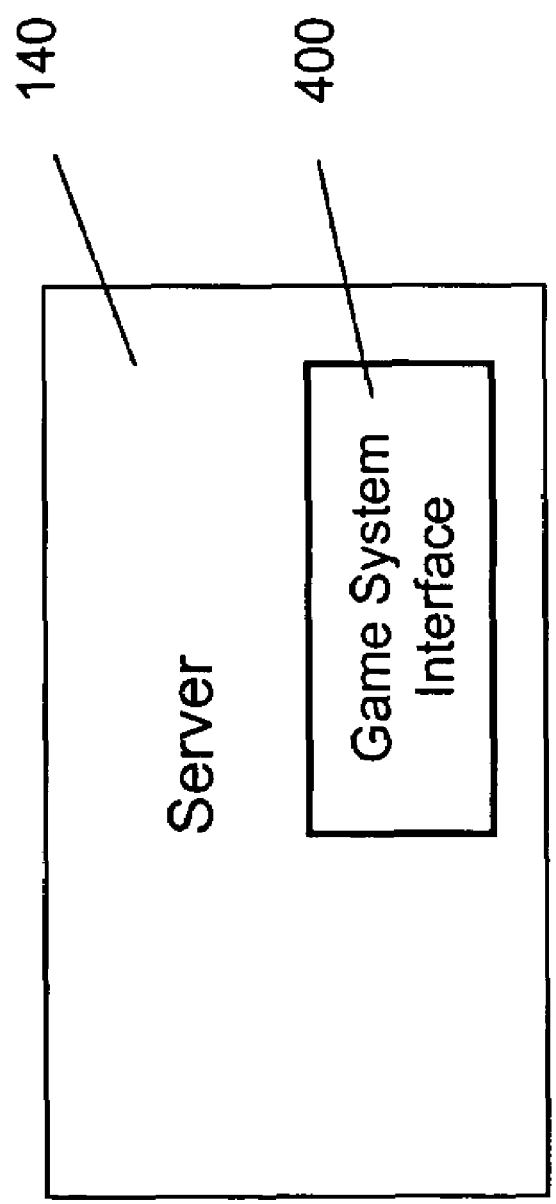
FIG. 4A shows a Game System Interface application that is stored on a server in the network-based game system shown in FIG. 1 in accordance to an embodiment of the present invention.
Figure 4B:
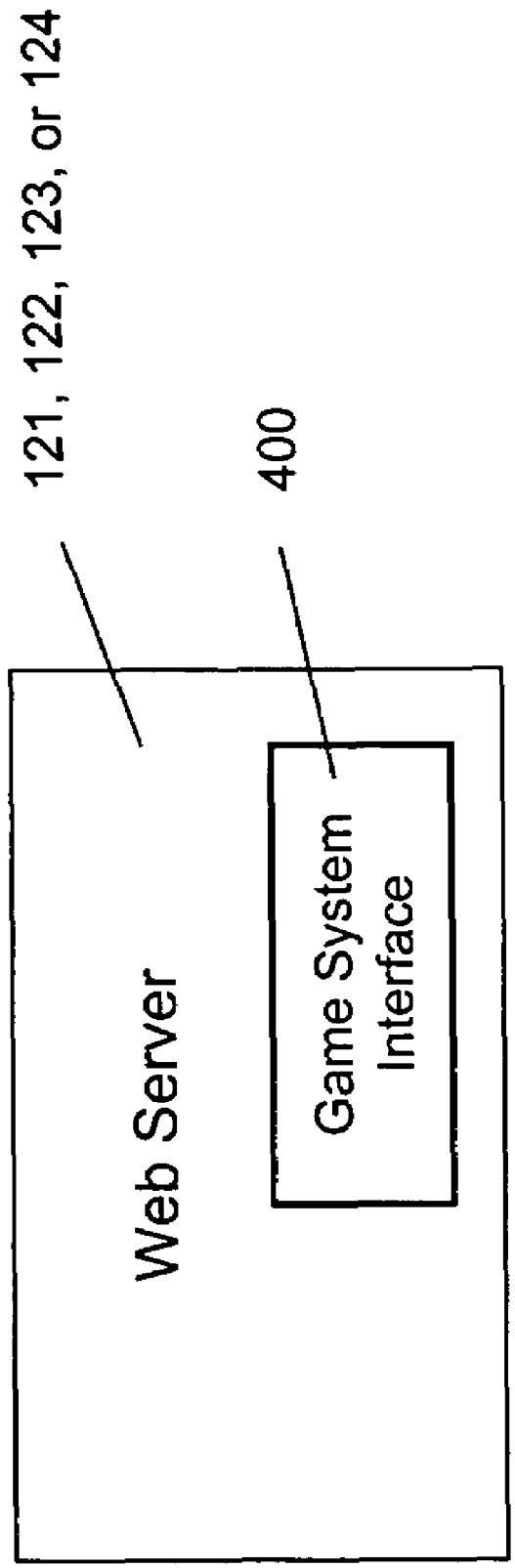
FIG. 4B shows a Game System Interface application that is stored on a web server of FIG. 1 in accordance to another embodiment of the present invention.

The network-based game system 100 includes a Game System Interface (GSI) program 400 that can be stored on a server 140 as shown in FIG. 4A, on the web server 121, 122, or 123 as shown in FIG. 4B, or on other servers such as the game servers 141-143 connected to the computer network. This server that the GSI program 400 resides on can be a single computer or a load-balanced cluster of servers. Each request to the GSI program 400 is an autonomous transaction and therefore does not require a persistent connection between the GSI program 400 and the other party (e.g. the game client application 200 or the game engine application 300).

The GSI program 400 provides information to clients such as the game client application 200 in response to requests but does initiate communications. The GSI program 400 can respond to the requests from the game client applications 200 running on the computer devices 106 and 107. Similarly, the GSI program 400 can also provide game information in response to the requests from the game engine application 300.

Figure 5:
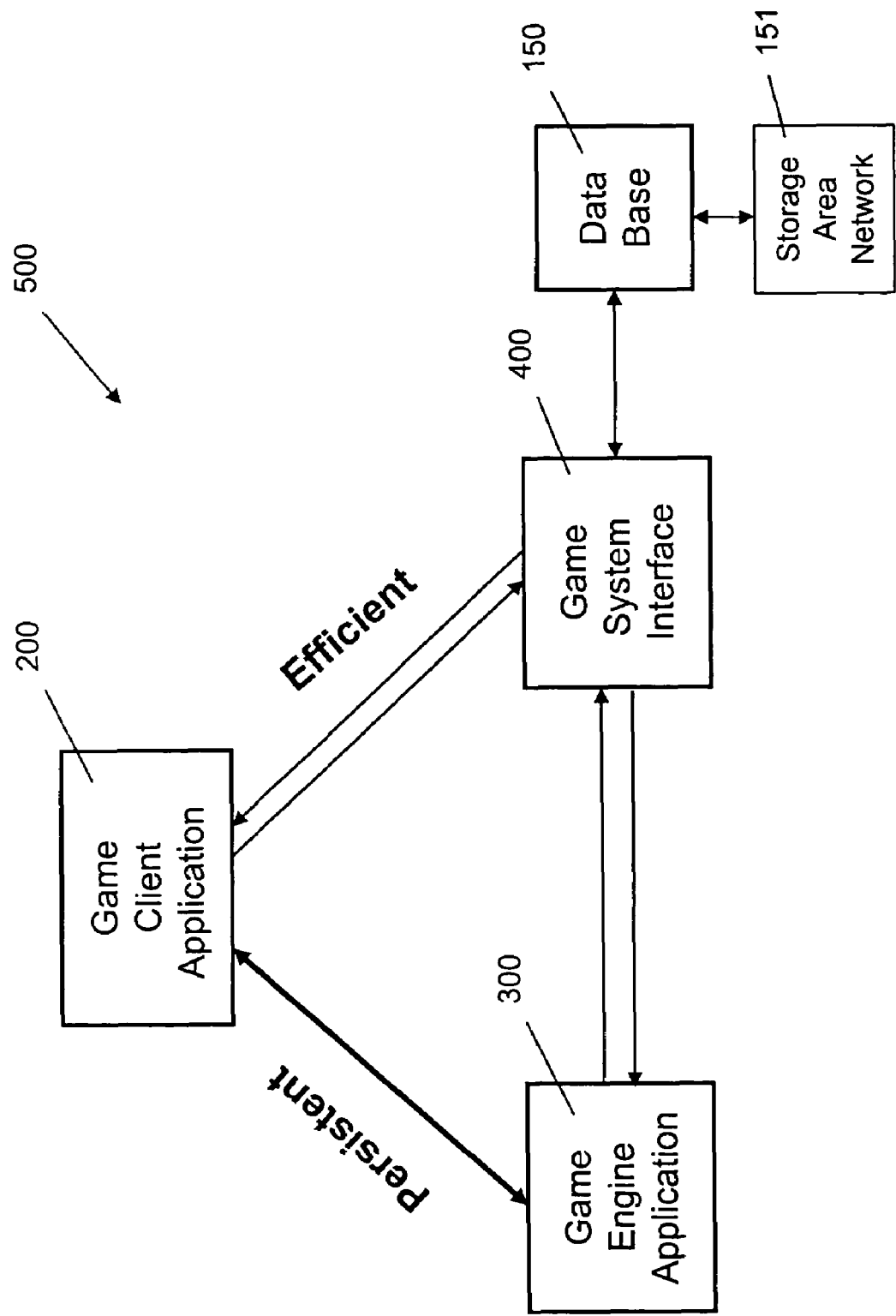
FIG. 5 shows a system diagram of a persistent and efficient game architecture compatible with the network-based game system of FIG. 1.

FIG. 5 shows a system diagram of a persistent and efficient game architecture 500 in the network-based game system 100. The persistent and efficient game architecture 500 include the game client application 200, the game engine application 300, and the GSI program 400, which provide a persistent communication path and an efficient but non-persistent communication path for the game client application 200. The GSI program 400 is connected to the data base 150 and a Storage Area Network 151 for saving updated data in the current game and retrieving data from the current and past games. The games are run on the game client applications 200 and communicate with the game engine applications 300 through the protocols defined by the game client application 400.

Figure 10:
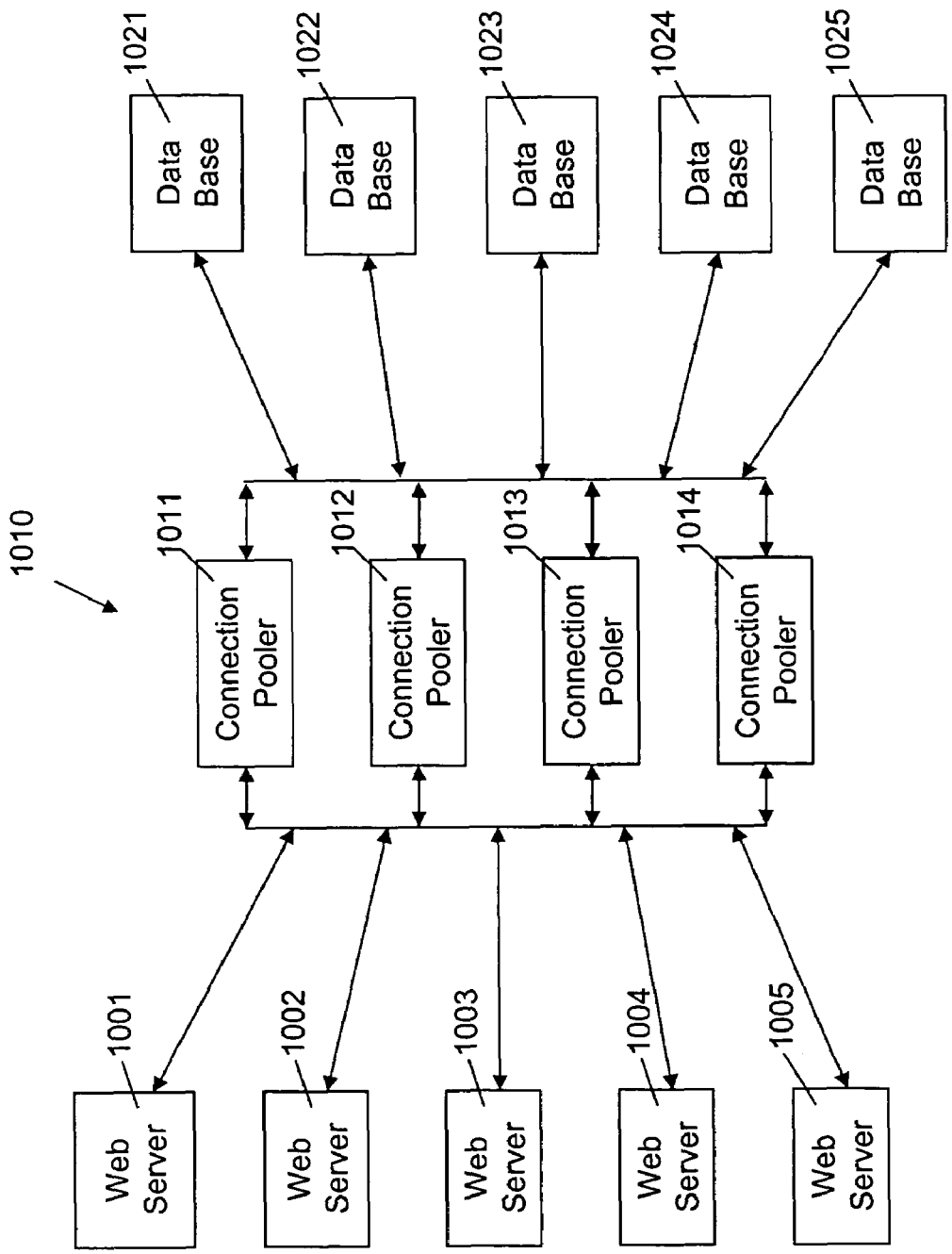
FIG. 10 is a block diagram for the web servers, the connection poolers, and the data bases.

One or more connection poolers can be added between the web servers 121-124 or the server 140 running the GSI 400 and the data bases 150 to support a large number of game players. The connections between the web servers 121-124 or the server 140 and the data bases 150 are combined to form proxy data base connections by the connection poolers. The proxy data base connections can be efficiently used to process simultaneous web queries by the game client applications 200. Details of the scaled up network-based game system is shown in FIG. 10.

An advantageous feature of the disclosed network-based game system is that it includes a persistent communication path and a non-persistent communication path for the remote game client application. The persistent communication path is used for exchanging short and instantaneous messages that a game needs to be updated in real time, but does not need to be stored permanently on data storage. The real-time two-way communications between the game client application 200 and the game engine application 300 are fast and without network latency. There is no cycle time spent on accessing and storing the exchange information on a data storage device. The persistency of the network connection between the game client application 200 and the game engine application 300 typically last through a game session.

The non-persistent communication path is efficient, which allows the amount of information communicated in real time to be minimized. As a result, the network-based system is scalable to a large number of game players. The non-persistent communication path is used to communicate information that is of "long-term" use to the games or the game players and does not require instantaneous and resource-intensive communications. The information may include the attributes and statistics of the game player such as his or her game scores, the equipment he or she purchased to be used in the games, the "money" he or she owns from the past and the current games, and so on. The information not only is needed for the current game, but also needs to be stored and retrieved for future games. Thus the information exchanged between the game client application 200 and the GSI program 400 often involves the access or retrieving data from the data base 150 and a data storage device such as SAN 151, and writing and saving data to the data base 150 and a data storage device. The interactions between the game client application 200 and the GSI program 400 are usually single requests that can be answered. The connection is then closed. In other words, no persistent network connection is required for these communications throughout a game session.

The persistent and efficient game architecture 500 shown in FIG. 5 differs from certain prior art systems that integrate the different types of communications into the same application layer. The same application layer handles real-time persistent communications and communications that do not need to be real time (which is in contrast to the separate game engine application 300 and the GSI 400 provided in the persistent and efficient game architecture 500). This type of prior art systems requires persistent network connections for both types of server communications throughout the game sessions. Each of the server instances is to be managed by a much larger and more resource-intensive application layer than the presently disclosed system. The burden to the application layer grows rapidly as the number of game clients or the number of games grows, which often increases the chance for failure, slows the responses, or degrades reliability. Furthermore, the present disclosed system is much more scalable compared to this type of prior art systems.

Each game engine application 300 can support one or many game client applications 200. The GSI program 400 can support many game client applications 200 and many game engine applications 300. The game logic can be stored inside the game client application 200, for example, in the form of compiled flash SWF files that are loaded on the web browsers on the computer devices 106 and 107.

The game client application 200 can be loaded via web browser running on the computer devices 106 and 107. The game client application 200 can include many game logics to allow a player to play many games. Alternatively, the game play logic can also be remotely stored on a server (such as 121-124 or 140-143) in the network-based game system 100. For example, the game logic can be included in the game engine application 300 or the GSI program 400 that can typically accommodate more complex game logic than game client applications. The remotely stored game logic can be activated remotely in real-time with secure processing on the servers (such as 121-124 or 140-143) or downloaded to the game players' computer devices 106 and 107 before a session starts.

To start a game, a game player can access a game service website such as the one operated by Gaia Interactive Inc., based in California, USA. The game player can initiate a game session by clicking a game client application 200 on a web page presented by a web browser application running on a computer device 106 or 107. In the present invention, a game session refers to an active connection between the client game application 200 and other programs such as game engine application 300 and GSI program 400 stored in the network-based game system 100. The game client application 200 can also be in the form of stream media (e.g. Flash SWF) so a game can keep loading as game-play starts.

In one embodiment, a game can be started and a game session can be initiated directly from the game client application 200 to the game engine application 300 after authenticating with GSI 400, without the need to access a webpage.

Many game client applications can be loaded on a computer device 106 or 107. Each game client application 200 can include game logic for one or more games. In one embodiment, the game client application 200 can be a Flash plug-in provided by Macromedia. The Flash plug-in can be downloaded, installed, and attached to a web browser. The Flash plug-in allows the web browser to play SWF movie clips in the web-browser it finds referenced in a webpage. Each SWF movie clip can include a unique game. The SWF movie clips contain the game logic as well as animations, images, and other effects. The SWF movie clip can communicate with servers in the network-based game system 100 using the library of functions provided by Macromedia's Flash plug-in and libraries of APIs developed for the network-based game system 100. Each game engine application 300 can support one or many game client applications 200 and thus many game logics.

During a game session, each game client application 200 can be supported by a game engine application 300 with a persistent connection in the network-based game system 100, that is, the game client application 200 and the game engine application 300 can send requests to each other and receive instantaneous responses at any time during a game session. A stop in the two-way communications between the game client application 200 and the game engine application 300 is typically interpreted by the game engine application 300 as the leaving of the game session by the game client application 200.

The network-based game system 100 can include many game engine applications 300 stored on the game servers 141-143. Each of the game engine applications 300 can be based on different game platforms that may be developed by the game service provider such as Gaia Interactive, Inc., or sourced from a third party game developer. The game player can thus access a wide range of network-based games at many game engine applications 300 that run on game platforms. Different game client applications 200 can be installed on the computer devices to run specific games supported by the corresponding game engine applications 300.

During a game session, the game client application 200 can pull information related to the specific game or game session from the game engine application 300. The game engine application 300 can respond to the requests instantaneously. The game engine application 300 can also update the game client application 200 with animations and short-term game information that do not need to be permanently stored. The short-term information, for example, can include the position of a soccer-ball on a field as it is being kicked around, the path a player's avatar is moving along on the field or the current pose an avatar is in, and the instant message chat communication between players in a game room, including text-based chats and emoticons. A game room allows a plurality of remote game players to play the same game with each other. The game players can play team based competitive games such as soccer, ice hockey, or football, or they can play individual based games such as fishing, car racing, etc.

In another embodiment, the network-based game system 100 can host many game players playing the same game client applications in a common game session. The game players can, for example, compete with each other in a ball game or fishing game in the game session. The game players playing can also be depicted as playing in the same game room. In the multi-player game sessions, the game engine application 300 can broadcast updates to many game client applications 200 running on many computer devices 106, 107 that are in the same game room.

The game engine application 300 can establish the players in the same game room as peers. The game engine application 300 can conduct peer-to-peer communications in real time by broadcasting a player's actions or events over that player's game client application to other peers' game client applications in the same game room. Each game client application 200 in the game room can construct a message and request the game engine application 300 to forward to the message another peer or all the peers in the same game room.

The GSI program 400 can respond to the requests from the game client application 200 running on the computer devices 106 and 107. The GSI program 400 typically answers questions but does not initiate requests by the game client applications 200. When a player enters the game website or when the player staffs a game session, the game client application 200 requests an authorization from the GSI program 400. The GSI program 400 creates a new session ID for the user at login. The GSI program 400 verifies the user ID and session ID and returns validation message to authenticate the game session. The responses by the GSI program 400 in general do not need to be persistent. For example, they do not have to communicate through SOCKET connections. This flexibility allows a GSL program 400 to answer more calls and enables the network-based game system 100 to handle a large number of game client applications and game players simultaneously.

The game client application 200 asks the GSI program 400 which game room to join for a given game. The GSI program 400 checks information received from the game engine applications 300 to see whether or not a game room has been created for that game. If the game room exists, the game client application 200 enters it. If the game room does not exist, the game client application 200 requests the game engine applications 300 to create one. The game engine application 300 creates the game room and passes the information to the GSI program 400 for verification. The GSI program 400 validates and returns a verification message including a new game room ID to the game engine application 300 that in turn returns the verification information to the game client application 200. The game client application enters the new game room. In this sequence of the communications, the GSI program 400 does not initiate the request. It only validates the information in requests it receives.

After the game engine applications 300 creates the game room, it writes information about the game room back into the GSI program 400 and waits for the GSI program 400 to validate that the game room is OK. After receiving the validation from the GSI program 400, the game engine application 300 allows the game client application to enter the new game room.

The game client application 200 then requests the load of the game. For example, a SWF file is loaded by the plug-in at the request of the web browser. The SWF is executed by a Flash Plugin. Instructions inside the SWF tell it to connect to the GSI program 400. Instructions inside the SWF also instruct it to display the game environment and run the game interactions.

The GSI program 400 returns the variables necessary for loading the game and information for saving game results to the game client application 200. During the game session, the game client application 200 can request the saving of the game results. The GSI program 400 validates the data to be saved and returns whether or not the saving is succeeded. The GSI program 400 also gathers information about all the players in the same game room and broadcast the information to the game room. In general, the GSI program 400 can respond to hundreds of different types of calls by the game client applications 200. The GSI program 400 can typically communicate with game client application 200 in the range of 0.001-0.1 milliseconds depending on network latency and the processing time. The priority for the performance of the GSI program 400 is that it can respond to all the requests, but not necessarily in real time.

The GSI program 400 controls the load balance and the distribution of players in the game rooms across multiple game servers 141-143 on which the game engine applications 300 reside. The GSI program 400 verifies that game rooms for a given game are not duplicated by accident. During the game sessions, the game client applications 200 updates the GSI program 400 with game status information such as game statistics and game configurations. Game statistics for example can include game scores of a game player, the asset and money that a player has accumulated, number of games played etc. Game configuration can include game equipment, game location, favorite games, etc.

Tokens and validation keys can also be passed from the game engine application 300 to the game client applications 200 to make sure different actions are occurring in the correct order and are not being spoofed by the client game application 200. The game client application 200 may be required to return the tokens and keys combined with other variables to ensure that the game's integrity has not been compromised.

The GSI program 400 sends the game status information to data base 150 and storage area network to store the game status information into the user account such that the user can keep his or her record even after the specific game session is ended.

An advantage of the present invention is that it allows scalability up to a large number of game players in the same game room or in different game rooms. The communications to the game client applications are divided into persistent real-time communications and efficient but non-persistent communications. The amount of information communicated in real time is minimized. A flexible layer by game-system-interface (GSI) program handles the non-persistent communications, which allows the network-based game system to handle an ever-increasing number and variety of game client applications.

The GSI program 400 can also respond to requests from the game engine application 300 as shown in FIG. 5. The GSI program 400 provides information to the game engine application 300 as requested but the GSI program 400 does not initiate messages to the game engine application 300. The game engine application 300 informs the GSI program 400 of all players and game rooms created. The game engine application 300 also sends user ID, session ID, game room ID to the GSI program 400 for validation. The GSI program 400 responds to the game engine application 300 to validate of the game rooms, the game sessions and the user ID. The game engine application 300 can communicate with the GSI application 400 over its own local host loop-back IP address (since the GSI program 400 can be installed and run on the same computer as the game engine application 300), eliminating network latency between the game engine application 300 and the GSI program 400.

Figure 6:
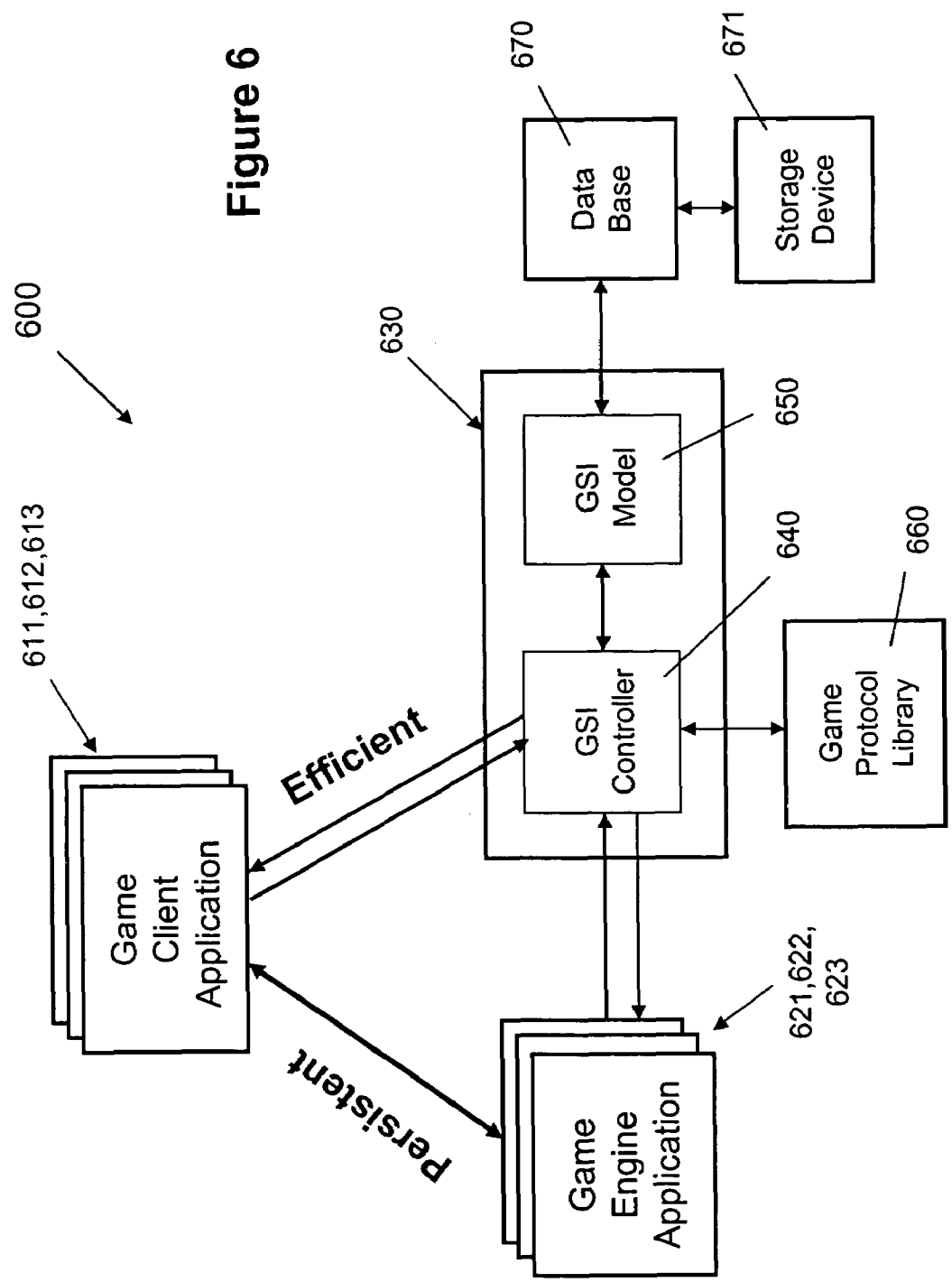
FIG. 6 shows a system diagram of a game architecture compatible with the network-based game system of FIG. 1. The game architecture is capable of communicating in serialized messages under a plurality of communication protocols.

FIG. 6 shows a system diagram of a game architecture capable of communicating in serialized messages under a plurality of communication protocols. A plurality of game client applications 611-613 can be running on a multiple of computer devices 106 and 107 to support multiple game players to play in the same or different game rooms. Each computer device 106 and 107 can host multiple of game client applications 611-613. The game client applications 611-613 can communicate with one or more game engine applications 621-623 in communication paths that are persistent through game sessions. The responses are real time without network latency, but the information communicated is specific to each game session and are not required to be stored after a game session is ended. The game engine applications 621-623 can communicate in different languages defined by serialization communication protocols such as PHP (Hypertext Preprocessor), XML, AMF, XML-RPC (Remote Procedure Call), etc.

Figure 7:
FIG. 7 shows a table that lists a plurality of game engines that can communicate under different serialization protocols.

The game client applications 611-613 can also communicate with a Game System Interface (GSI) program 630 in an efficient communication path. The GSI program 630 is intended to provide a logical structure for connecting the game client applications 611-613 to application logic on one or more servers in the network-based game system 100. The GSI program 630 can respond to requests from the game client applications 611-613 and the game engine applications 621-623. Each request/response cycle is a separate session that is not required to be persistent through the game session. Moreover, the requests to and responses by the GSI program 630 can be asynchronous communications. The GSI program 630 includes two application layers: a GSI controller 640 and a GSI model 650. The GSI controller 640 can access a game protocol library 660 that can be stored in a storage device connected in the network. An exemplified table 700 in the game protocol library 660 is shown in FIG. 7. The table 700 lists a plurality of Game IDs such as "Fishing", "Soccer", "Halloween", "Treasure Hunt", "Survival", etc. One or more game IDs are supported by a game engine (GE1, GE2, GE3 . . . ). The game engines GE1, GE2, GE3 . . . are coded to communicate under different serialization protocols such as PHP, XML, AMF, XML-RPC, and PHP that can be transported using a variety of Internet protocols, including HTTP, SMTP, and MIME. The communication protocols are independent from the operating systems on the computer devices 106 and 107 or on the servers in the network based game system 100. The communication protocols can be independent of the game logic, the game rooms, and the game engine applications. Different game client applications 611-613 can even use many different communication protocols to enter the same game room at the same time. The GSI program 630 provides multiple message serialization protocols, allowing multiple client types to communicate with the game engine applications 621-623, the data base 670 and storage device 671 through the GSI model 650.

The GSI program 630 publishes a list of communication protocols to provide a standardized method of message delivery. For instance, a communication protocol can abstract different representations of different types of data into a serialized encapsulation, which allows a common representation of data for different languages used on different computer devices. Importantly, this enables communication with unknown client applications residing on a computer whose programming language is unknown to the GSI program.

The communication protocols can include encryption rules and decryption rules for serializing or de-serializing messages as shown in FIG. 7. The game client applications 611-613 and the game engine applications 621-623 are built with libraries that handle the translations under different protocols. For example, the game client applications 611-613 and the game engine applications 621-623 can decode serialized packet into its own internal language to understand data contained in a serialized encapsulation. Similarly, request messages to the GSI program 630 can be encrypted using these natively stored protocols before sent to the GSI program 630. The game client applications 611-613 and the game engine applications 621-623 use the communication protocols to invoke requests to the GSI program 630 and interpret reply messages from GSI program 630.

The GSI program 630 provides a single entry point for requests from all game client applications 611-613. This architecture allows the game client applications 611-613 bundle multiple asynchronous requests in the same HTTP requests (i.e. boxcar method). Furthermore, requests in different communications protocols can be bundled in the same HTTP message. The GSI program can subsequently respond to the bundled HTTP requests in one bundled HTTP response. The boxcar method allows efficient information transfer at low communication barrier. In contrast, a game architecture comprising multiple entry points for the game client applications cannot allow the bundling of different requests if the requests are intended to be received by different entry points.

The GSI program 630 separates message serialization from application logic. The message serialization and de-serialization is handled by the GSI controller 640 whereas the application logic is processed by the GSI model 650. The GSI program 630 is built using a hybridized MVC (Model View Controller) architecture including two application layers the GSI controller 640 and one or more GSI models 650. The GSI controller 640 is a single gateway responsible for controlling the requests and routing the requests to specific GSI models 650 and then returning the responses back to the game client application 611-613. Each GSI model contains the application logic for each particular method call. The GSI models 650 accept parameters and return responses. The GSI models interpret de-serialize messages sent by the game client applications 613-613 or the game engine applications 621-623 and serialize the responses from the model using the same protocol as the initial request. Views de-serialize messages sent by the client application and then serialize the response from the model using the same protocol as the initial request. In sum, the GSI controller 640 controls what application logic is called. The GSI models 650 house that application logic. The view formats the information provided by the GSI model 650.

The architecture comprising the GSI program 621-623 include one or more advantages. The GSI program 621-623 allows a lightweight client to server-side application logic. The GSI program 621-623 allows the connection of two different servers that do not use the same programming language such as Java, Flash ActionScript, and PHP. The serialization protocol makes it possible to represent data-structures that are different from one server to the next. For the data in a received message to be used by a server, the message must be de-serialized and translated into its own language so that the data can be manipulated. The serialization protocol provides read-only representations of the data. Once the data is de-serialized, it is manipulated by the native language methods until the data needs to be returned. It is then re-serialized and sent off. The client applications can communicate with the servers in the network-based system 100 in different message serialization protocols. Furthermore, the application logic accessible to GSI models 650 can be broken down into a series of discreet requests for specific information and each method invocation answers a specific question.

One or more connection poolers can be added between the web servers 121-124 or the server 140 running the GSI program 630 and the data bases 670 to support a large number of game players. The connections between the web servers 121-124 or the server 140 and the data bases 670 are combined to form proxy data base connections by the connection poolers. The proxy data base connections can be efficiently reused to process simultaneous web queries by the game client applications 611-613. Details of the scaled up network-based game system is shown in FIG. 10.

Figure 8:
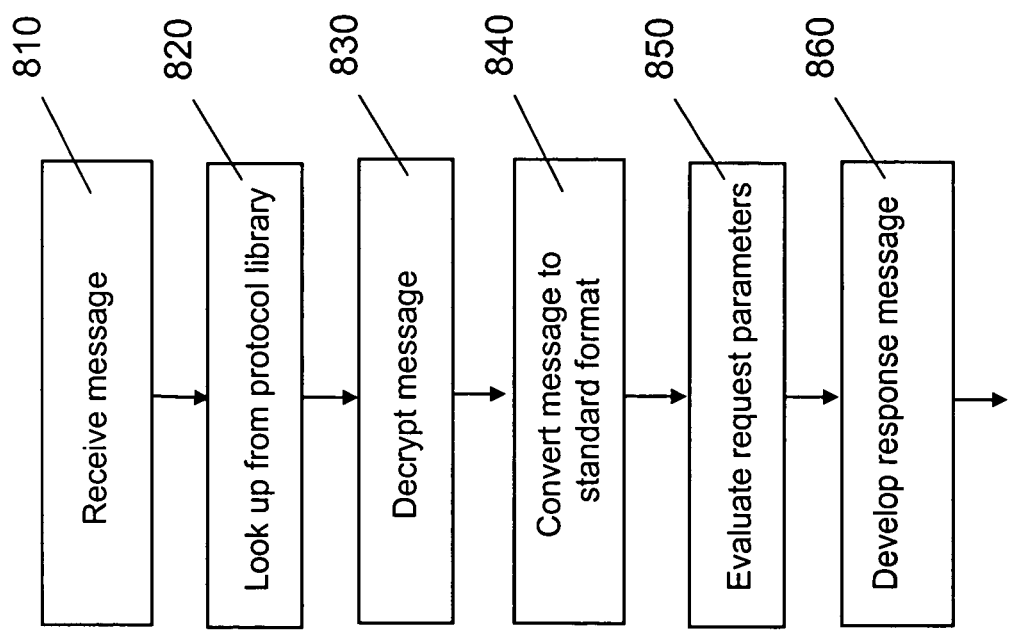
FIG. 8 shows a flow chart for the communication between the Game System Interface application and a game client application or a game engine in a network-based game system.

FIG. 8 shows an exemplified flow chart for the communication between Game System Interface application and a game client application or a game engine. A game client application 200, 611-613 submits a request to a URL or other communication layer, which is received by the web server 121-124. In step 810, the web server 121-124 instantiates a GSI controller 640 to handle the request. In step 820, the GSI controller 640 evaluates the request and determines which communication protocol is to be used. The communication protocol may be indicated in a header in the request message or stored at a storage location defined by an URL. The GSI controller 640 then instantiates a view object from the game protocol library 660. The view object can include decryption and encryption rules for the protocol. The GSI controller 640 asks the view object to de-serialize the request. The view object de-serializes the request in step 830 and returns the request in a standardized format to the GSI controller 640. The GSI controller 640 evaluates the request in step 850. The GSI controller 640 instantiates a GSI model 650 to handle different sections of the request. The GSI model 650 accepts the parameters passed in by the GSI controller 640 and returns a response in step 860. The GSI controller 640 captures the result of these operations and passes them to the view object. The view object serializes the response in step 870. The GSI controller 640 returns the serialized response to the game client application 200, 611-613. A GSI program 621-623 closes the request. The message from the game client application 200, 611-613 often includes game status information that need to be stored in the player's account to allow the information to be available after the game session ends. The game status information can include game scores of a game player, the asset and money that a player has accumulated, game equipment, and game location. A DAO (Data Access Object) is instantiated in step 880. A data base query (e.g. SQL query) is instantiated to update the data base 150, 670 in step 890. The game status information in the request is written in the storage device 671 in step 895. The request/response communication cycles between the game engine applications 300, 621-623 and the GSI program 400, 650 can be conducted in a similar fashion as described above.

The massive growth in the number of game players is a serious challenge to the capability of a network-based gaming system. For a network-based system such as Gaia Interactive Inc., the number of game players can grow from hundreds of thousands, to millions, or even tens of millions at each time. The massive amount of activities can produce tremendous web traffic to the web servers in the network-based gaming system. The spiking of web traffic by simultaneous users during the peak hours can cause an overload of the network-based gaming system, which can cause sluggish web page loads, errors in connecting to data stores, and the denial of services to the users.

In a conventional load balancing architecture, the load balancer funnels traffic to the web servers as long as they are responding, regardless of whether or not the web servers can efficiently process the requests. The load balancer guesses whether or not a web server is healthy, which can result in a huge spurt of traffic to the web server until the web server becomes so overloaded and stops responding. When this situation occurs, the web server slows down; and the connection to a data base stays open and sits idle longer. The productivities of the web servers and the data bases can all take big hits. Meanwhile, the users waiting for the response from the web servers usually try reloading the same web pages when they don't get an immediate response, causing repeated requests of the same information to be made. During these events, the web traffic can be so overwhelming that the gaming web site becomes unusable.

The network-based game system 100 can overcome the above described problems by improved network architecture for the game client applications, the web servers, and the data base. One or a cluster of load balancers can be placed between the web servers and the game client applications to manage the request to the web servers. Simultaneous requests to individual web servers can be regulated to prevent the web servers from being overwhelmed. The connections between the web servers and the data bases are combined to form proxy data base connections by a server (i.e. connection pooler). As described below in more detail below, the proxy data base connections with the connection poolers can be shared by web queries from different game client applications or game engine applications. The web queries can be efficiently processed.

Figure 9:
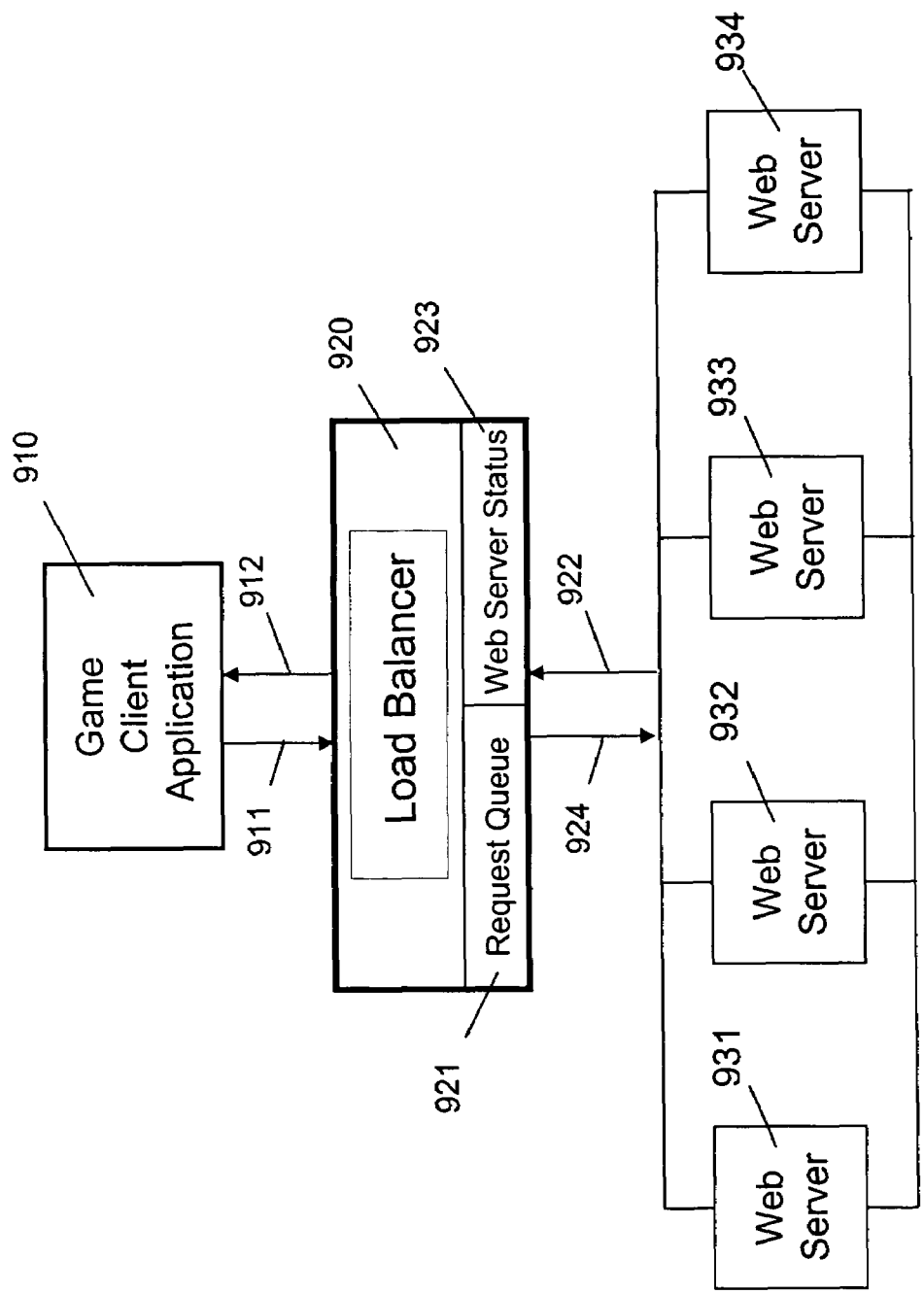
FIG. 9 is a block diagram for the client application, the load balancer, and the web servers.

FIG. 9 is a block diagram for a client application 910, a load balancer 920, and web servers 91-934 in the network-based game system 100. The game client application 910 running on a computer device 106 or 107 first makes a web request 911. The web request 911 is typically made at a website hosted by the network-based gaming system 100 The request is accepted by a load-balancer server 920. In general, the requests from the game client applications 910 can be handled by one or a cluster of load-balancer servers 920 inside the network-based game system 100. The requests from a number of game client applications 910 running on one or a large number of computer devices 106 or 107 can be managed in the request queue 921 that is stored on the load balancer 920. The request queue 921 can be processed in a first-in-first-out fashion (FIFO), that is, the oldest request in the request queue is the always the next request to be processed.

The network-based game system 100 includes a plurality of web servers 931-934. A software agent is stored in each of the web servers 931-934 to keep track of the total requests handled by the web server 931-934. The agent can be programmed by a set of predetermined policies to govern the request workload at the web server 931-934. For example, the agent can set a maximum number of requests that can be handled by each web server 931-934. When the requests being handled by a web server 931-934 is at its maximum, the software agent will flag the web server 931-934 unavailable for receiving more requests. When the requests being handled by a web server 931-934 is below its maximum, the software agent can flag the web server 931-934 to be available for receiving more requests. In general, the available and the unavailable criteria can be based on different request numbers with the available request number being lower than or equal to the unavailable request number. The constraint on the maximum request at a web server reduces the probability that the web server becomes overloaded. The web server can therefore process web requests quickly and move on to the next incoming web request faster.

The web server status 922 of the web servers 931-933 can be communicated to the load balancer 920 and stored as web server status 923 in the load balancer 920. Once the web server status 923 indicates that one of web server 931-934 becomes available to accept new requests, the load balancer 920 can send a new request 924 to that web server. The web server communicates with the connection poolers 160, 1011-1014 to query and retrieve the information requested (see FIGS. 10 and 11 and related discussions below). The web server 931-934 returns the requested information to the load-balancer cluster 920. The web server 931-934 is now ready to accept for a new request. Meanwhile, the load-balancer 920 returns requested information 912 to game client application 910. The requested information 912 can be displayed on an html page generated by the web server 931-934 and passed to game client application 910 through the load balancer 920.

As discussed above, the request queue 921, the web server status 923, and the associated communications 922, 924 with the web servers 931-934 are implemented in a "pull-type" architecture that allows web requests 911 to be regulated by the actual workloads of the web servers 931-934. The software agent in the web servers 931-934 allows the web requests 924 to each web server 931-934 to be controlled below a maximum number.

An advantage of the "pull-type" architecture in the invention system is the prevention of the overloading at the web servers. In contrast, a "push-type" architecture distribute requests to web servers without the knowledge of the true workload at the web servers, which can overwhelm the web servers and degrade performance of the web servers. In some cases, an overwhelmed web server can be completely stalled. No information can be returned to the load balancer or the game client application.

An advantage of the invention system is that web servers can focus on processing the web requests by being alleviated from other tasks. The load-balancer is responsible for receiving the entire request content and passing requested information back to the game client application. The web servers are also relieved of the responsibility of communicating directly with the game client applications. Thus the web servers will not be dragged down if the game client applications lag. The web servers are allowed to focus on processing the requests.

The network architecture shown in FIG. 9 allows more web requests to be simultaneously processed by the network-based game system 100. Drastically improved performance was observed in the system implementation. For example, web page loads that took between 3-5 seconds were reduced to less than 0.1 seconds. Game players experienced far less latency in web requests even in high-load situations. Moreover, in the rare events that the web traffic begins to top out the maximum capacity, the performance of the network-based game system degraded gracefully and gradually, the network-based game system was not disabled or caused page load errors and other unpredictable behavior.

FIG. 10 is a block diagram for the web servers 1001-1005, a proxy server cluster 1010, and the data bases 1021-1025, which can be a portion of the network-based game system 100 as shown in FIG. 1. A Game System Interface can be run on the web servers 1001-1005 to handle the requests from the game client applications 910 through the load balancer 115, 920. The proxy server cluster 1010 includes a plurality of connection poolers 1011-1014. To conduct a data base query, a web server 1001-1005 sends the query to the proxy server cluster 1010 in a persistent network connection. The persistent network connection between a web server and the proxy pooler cluster 1010 is usually short-lived which lasts the lifetime of a web request. Thus many queries can be made to different data stores in that web request. These persistent network connections are stateful. (In contrast, as discussed above, the connections between the game client application and GSI can be stateless and not persistent.) In other words, a web server can authenticate a connection pooler and then issue a series of web queries to the connection pooler over the same persistent network connection until it receives all the requested information in the web request. It then closes the persistent network connection. The web server can thus use a single persistent network connection with the connection poolers 1011-1014 to query many different data bases 1021-1025.

In general, the requests from the game engine applications to the GSI running on the web servers can also be routed to the connection poolers just like the requests from the game client applications.

The connection pooler 1011-1014 can open up persistent network connections with the data bases 1021-1025 to transmit the queries to the proper data base 1021-1025. These persistent network connections can be long-lived (e.g. days or even weeks). The persistent network connections between the connection pooler 1011-1014 and the data bases 1021-1025 allow instantaneous two-way communications and guarantees the queries are to be conducted without network latency. As described in detail below, each persistent connection can handle a large number of unrelated queries.

Each data base 1021-1025 can be connected with one or more computer storage device where the game information is stored. The architecture shown in FIGS. 1 and 10 is a significant improvement from an earlier version of the network architecture for the game system. The earlier version of the network-based game system included one primary monolithic data base and a few secondary data base servers. All user data were replicated to all the other servers. As the amount of data increased with the number of game players and the number of games provided, the volume of updates to the data rapidly increased. Replications began to slow down and fail. In addition, the primary data base became overloaded and was unable to respond to web requests from the game client applications. The large amount of data stored on each machine prevented them from being cached in dynamic memories, which meant that most of the queries required significant disk-seek times and thus showed low performances.

In the invention system shown in FIGS. 1 and 10, all the data is segmented into distinct data bases 150, 1021-1025 and their associated computer storages and storage area network 151. Instead of one master data base, the data bases 150, 1021-1025 are all master data bases that do not need to be replicated. For example, there can be 20, 30 or more data bases 150, 1021-1025 in a network-based game system 100. Each data base 150, 1021-1025 contains a small segment of the total data. Because the data size stored on each data base 150, 1021-1025 is smaller and limited to a particular service, the data base can respond much more quickly to queries because the 'web pages' can be stored in dynamic memories and require no disk seek time. In general, the web servers 1001-1005 can also include the server 140 in FIG. 1 because the Game System Interface 400 can also be stored on the server 140.

The data contained in the data bases 150, 1021-1025 can include game information. In the present application, game information can include information about the game players such as user identification, user account information, the user's gaming history and game preferences, the user's credits and currencies, and the contacts, playmates, teammates, and buddies of that users. The game information can also include game session identification and game room information.

Another significant feature of the invention system in FIGS. 1 and 10 is that it can efficiently handle data queries to multiple data bases for each web request. The user data from different users or even the same user can be distributed on different data bases 1021-1025, the rendering of each web page by a web server can often require the opening of multiple connections to different data bases 1021-1025. A complex web page may require as many as 10 such data base connections. As it is known, opening data base connections involves the overhead of a socket connection, the overhead of a thread creation in a relational data base management system (RDBMS) such as mysql, and the proper management of the connections. As more and more web servers are added and higher and higher numbers of connections are opened and closed, the RDBMS threads and the web servers begin to show losses of performance.

One attempt to overcome the above described problem is to use persistent connections between the web servers and the data bases. The large number of web servers makes persistent connections impractical because the openings and closings of the large number of connections still consume too many CPU cycles and memory at the web servers and the data bases.

It was discovered that the mysql threads could easily keep pace with the volume of queries if there were a way to lower the overhead of the many simultaneous web server clients. It was conceived that performance could be improved if one connection can be opened to a web server and can then transparently pass off many requests to many different data bases. Finally, a proxy server cluster 1010 comprising connection poolers 1011-1014 is implemented as shown in FIGS. 1 and 10 to successfully solve the above described problem. The connection poolers 1011-1014 aggregate the data base connections behind a single proxy server cluster 1010. The proxy server cluster 1010 acts as a middle-man between the different data bases 1021-1025 and the web servers 1001-1005. The cluster of connection poolers 1011-1014 accepts connections from the web servers 1001-1005 and passes the queries to data bases 1021-1025 transparently. The queries to the data bases 1021-1025 can re-use an existing persistent connection to the databases 1021-1025.

The network connections between web servers 1001-1005 and the connection poolers 1011-104 and between the connection poolers 1011-1014 and the data bases 1021-1025 and are persistent. In other words, they are both socket connections and they both only authenticate once and then proceed to conduct a series of queries to another server. A web server 1001-1005 can open up a connection to a connection pooler 1011-1014 for the purpose of building one web page or to handle a GSI request. The web server 1001-1005 makes a series of queries to the connection pooler and then closes the connection as soon as it receives all the information for the GSI call. The network connection between a connection pooler and a data base can stay open for days, weeks, months until the data base fails.

An advantage of the invention system is that the web server communicates with only one proxy server cluster 1010 throughout the generation of a web-page or other such request. The majority of the queries passing through the proxy server cluster 1010 require only the opening of one direct connection to the data bases 1021-1025.

Another advantage of the invention system is that it is robust to hardware failures. Since the connection poolers are arranged in a proxy server cluster 1010, the crash of any one connection pooler 1011-1014 can be easily replaced by another connection pooler 1011-1014; the proxy server cluster 1010 will not fail.

Furthermore, the proxy server cluster 1010 can be scaled up horizontally by increasing the number of connection poolers to handle increased workload between the web servers and the data bases such that the CPU cycles and memory for each connection pooler is not over loaded. The proxy server cluster 1010 in the invention system shown in FIGS. 1 and 10 can be implemented as a software solution that is different from other connection pooling approaches. In the other approaches, a data base connection is allocated and reserved for a web server only until the web server releases the connection and passes the connection back into the pool. The proxy server cluster 1010 in the invention system takes advantage of the fact that many of the web queries in the game network system 100 do not need to be stateful, that is, the web queries do not have happen in a specific order and each web query can treated separately from the other queries. The connections can be immediately recycled for a different query after each query is finished, which extracts more query usage out of the data based connections. A data base connection does not stay idle. Instead, the data base connection is passed with a constant stream of unrelated queries from many different web servers 1001-1005. This added middle layer of the proxy server cluster 1010 surprisingly improves the system performance. The data bases 1021-1025 can now process queries faster without having to manage the web server connections. The web servers 1001-1005 can be more efficient because they can access a huge number of data bases 1021-1025 through a single connection.

Figure 11:
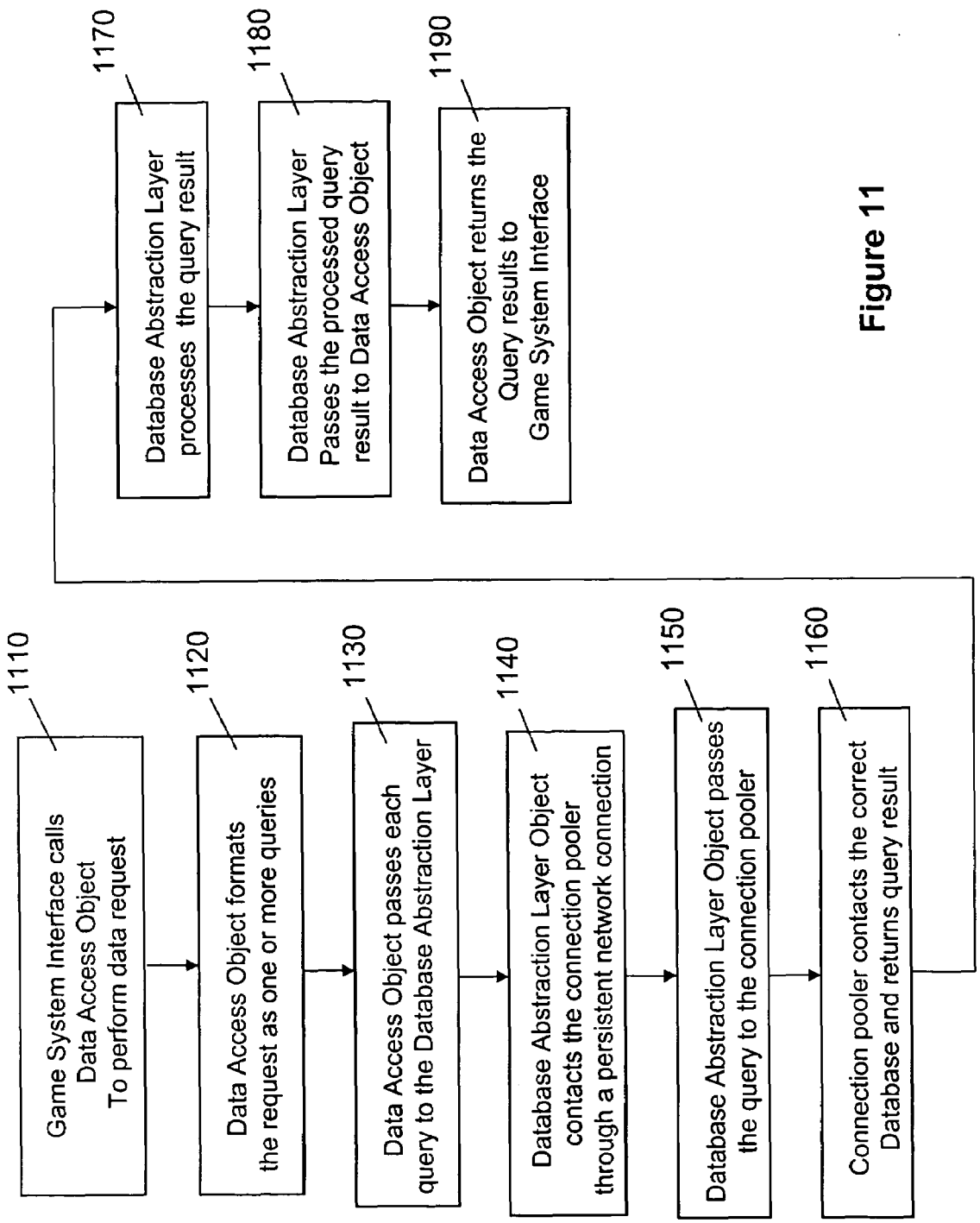
FIG. 11 is a flow chart for the communications among the web servers, the connection poolers, and the data bases.

FIG. 11 is a flow chart for the communications among the web servers 1001-1005, the connection poolers 1011-1014, and the data bases 1021-1025. Game system interface on a web server calls a data access object in the web server to perform data request in step 1110. The data access object next formats the request as one or more queries in step 1120. The data access object then passes each query to the data base abstraction layer on the web server in step 1130. The data base abstraction layer object on the web server contacts the proxy server cluster 1010 comprising the connection pooler 1011-1014 through a socket connection in step 1140. The data base abstraction layer object on the web server passes the query to the connection pooler 1011-1014 in the step 1050. The connection pooler contacts the correct data base, receives the query results from the data base, and returns the query result to the web server in step 160. The query result is typically in the form of a serialized message. The query result is next processed by the data base abstraction layer in step 1170, which is in turn passed to the data access object in step 1180. The query results are then returned, typically in aggregates, to the game system interface by the data access object in step 1190.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass many such modifications.

What is claimed is:

1. A network-based game system, comprising:
one or more web servers each configured to receive a first request and a second request from one or more game client applications each running on a computer device and to produce a first data base query and a second data base query in accordance with the first request and the second request;
a plurality of data bases configured to store game information configured to be retrieved in response to data base queries; and
a proxy server cluster comprising a plurality of connection pool servers that are connected in parallel, wherein the proxy server cluster is in communication with the one or more web servers and the plurality of data bases, wherein the proxy server cluster is configured to receive the first data base query and the second data base query from the one or more web servers in separate first persistent network connections, wherein the proxy server cluster is configured to direct the first data base query and the second data base query to one of the plurality of data bases in a single second persistent network connection, wherein game information related to the first data base query and the second data base query are retrieved from the plurality of data bases.

2. The network-based game system of claim 1, wherein the second persistent network connection is longer than the first persistent network connections.

3. The network-based game system of claim 1, wherein the proxy server cluster is configured to receive the game information retrieved from one or more of the data bases in the single second persistent network connection and to return the retrieved game information to the one or more web servers in the separate first persistent network connections.

4. The network-based game system of claim 3, wherein at least one of the web servers is stored with a game-system-interface (GSI) program that is configured to produce the first data base query in accordance with the first request from one of the one or more game client applications and send the retrieved game information to the one of the one or more game client applications.

5. The network-based game system of claim 1, wherein the one or more game client applications include a plug-in to a web browser application installed on the computer device.

6. The network-based game system of claim 1, wherein the first request and the second request are received from different game client applications.

7. The network-based game system of claim 1, wherein the first data base query and the second data base query are directed to different data bases in the plurality of data bases.

8. The network-based game system of claim 1, wherein at least two of the plurality of data bases are configured to store game information associated with different users.

9. The network-based game system of claim 1, wherein the game information stored on the plurality of data bases include one or more of user identification, user account information, users' gaming history, users' game preferences, users' credits and currencies, users' contacts, playmates, teammates, and buddies, session identification, and game room information.

10. The network-based game system of claim 1, further comprising a load balancer configured to receive the first request and the second request from the one or more game client applications and to send the first request and the second request to one of the one or more web servers when the web server is available to receive a new request.

11. The network-based game system of claim 10, wherein at least one of the one or more web servers is configured to inform the load balancer that the web server is available to receive a new request when the number of requests simultaneously processed by the web server is below a predetermined number.

12. A network-based game system, comprising:
a game server configured to store a game engine application that is configured to communicate with a game client application running on a computer device that connected to the game server in a first persistent network connection;
a web server in communication with said game server and in a non-persistent network connection with the game client, wherein the web server is configured to store a game-system-interface (GSI) that is configured to produce a first data base query in response a first request received from the game client application and to produce a second data base query in response a second request received from the game engine application;
a plurality of data bases configured to store game information configured to be retrieved in response to data base queries; and
a proxy server cluster comprising a plurality of connection pool servers that are connected in parallel, wherein the proxy server cluster is in communication with the web server and the plurality of data bases, wherein the proxy server cluster is configured to receive the first data base query and the second data base query from the GSI on the web server, wherein the proxy server cluster is configured to direct the first data base query and the second data base query to the plurality of data bases, wherein game information related to the first data base query and the second data base query are retrieved from the plurality of data bases.

13. The network-based game system of claim 12, wherein the proxy server cluster is configured to receive the game information retrieved from one or more of the data bases in response to the first data base query and the second data base query, and to return the retrieved information to the web server.

14. The network-based game system of claim 12, wherein the proxy server cluster is configured to direct the first data base query and the second data base query to the plurality of data bases in a single second persistent network connection.

15. The network-based game system of claim 12, wherein the proxy server cluster is configured to receive the first data base query and the second data base query from the GSI on the web server in third network persistent connections.

16. A method for providing game services to a plurality of remote users, comprising:
receiving a first request and a second request at one or more web servers from one or more game client applications each running on a computer device;
producing a first data base query and a second data base query by the one or more web servers in accordance with the first request and the second request;
receiving the first data base query and the second data base query at a proxy server cluster comprising a plurality of connection pool servers in separate first persistent network connections with the one or more web servers, wherein the connection pool servers are connected in parallel;
storing game information in a plurality of data bases;

directing the first data base query and the second data base query by the proxy server cluster to one of the plurality of data bases in a single second persistent network connection; and retrieving game information related to the first data base query and the second data base query from the plurality of data bases.

17. The method of claim 16, wherein the second persistent network connection is longer than the first persistent network connections.

18. The method of claim 16, wherein the first request and the second request are received from different game client applications.

19. The method of claim 16, wherein the first data base query and the second data base query are directed to different data bases in the plurality of data bases.

20. The method of claim 16, further comprising:
returning the retrieved game information from the plurality of data bases to the proxy server cluster in the single second persistent network connection;
returning the retrieved game information from the proxy server cluster to the one or more web servers; and
sending the retrieved game information from the one or more web servers to the one or more game client applications.

* * * * *